United States Patent [19]
Asler et al.

[11] 3,874,351
[45] Apr. 1, 1975

[54] ELECTRONIC IGNITION PULSE GENERATING AND TIMING CONTROL SYSTEM FOR INTERNAL COMBUSTION ENGINES

[75] Inventors: Karl-Heinz Asler, Maisons-Laffitte; André Bonin, Drancy; Georges Dubuisson, Boissy; Michel Juhé, Paris; Wolfgang Reichardi, Sevres, all of France; Edwin Fauser, Sersheim; Hermann Eisele, Nellingen, both of Germany

[73] Assignee: Robert Bosch GmbH, Stuttgart, Germany

[22] Filed: Feb. 4, 1974

[21] Appl. No.: 438,509

[30] Foreign Application Priority Data
Jan. 1, 1973 Germany............................ 2304827
Sept. 26, 1973 Germany............................ 2348352

[52] U.S. Cl............................ 123/117 R, 123/148 E
[51] Int. Cl............................ F02p 5/04, F02p 1/00
[58] Field of Search ........ 23/148 E, 146.5 A, 117 R

[56] References Cited
UNITED STATES PATENTS

| | | | |
|---|---|---|---|
| 3,314,407 | 3/1967 | Schneider........................ | 123/148 E |
| 3,592,178 | 7/1971 | Schiff.............................. | 123/148 E |
| 3,738,339 | 6/1973 | Huntzinger....................... | 123/148 E |
| 3,749,070 | 7/1973 | Oishi............................... | 123/148 E |
| 3,811,420 | 5/1974 | Vogel.............................. | 123/148 E |

*Primary Examiner*—Manuel A. Antonakas
*Assistant Examiner*—Ronald B. Cox
*Attorney, Agent, or Firm*—Flynn & Frishauf

[57] ABSTRACT

A comparator stage is connected to the output of a sawtooth wave generator which provides sawtooth waves, in synchronism with engine rotation. When the sawtooth wave reaches a predetermined value matched to a voltage representative of an engine operating parameter, as modified by engine operating characteristic functions, in a function generator, a signal is transmitted to the ignition pulse generating system to provide an ignition pulse at a proper timing instant, determined by the engine function characteristics in dependence on the operating parameter.

19 Claims, 8 Drawing Figures

ELECTRONIC IGNITION PULSE GENERATING AND TIMING CONTROL SYSTEM FOR INTERNAL COMBUSTION ENGINES

The present invention relates to an electronic ignition pulse generating and timing system, to provide ignition pulses for internal combustion engines, in which the timing of the ignition pulse, with respect to piston position of the piston of the engine can be changed in dependence on operating parameters of the engine.

Various devices have been proposed to change the ignition timing of internal combustion engines, typically of vehicular internal combustion engines, dependent on the speed or power to be supplied (as measured, for example, by vacuum in the intake manifold). The ignition timing is changed in accordance with certain characteristic curves defined by the design of the operating engine, to set the timing of ignition in dependence on the operating paramters, as measured, with respect to the characteristic operating curves. The change in ignition timing is usually obtained by changing, physically, the position of the cam, or of the breaker contacts of the ignition system by means of centrifugal weights, vacuum diaphragm chambers, and the like. The curves, or functions of speed of the engine, and vacuum in the inlet manifold, respectively, is however limited when centrifugal weights or vacuum membranes are used. It has, also, been proposed to use electronic ignition control systems, in which the ignition timing is electronically controlled. Such apparatus have, heretofore, required substantial use of material and components in order to obtain better matching of engine operating characteristics, and a better functional relationship, by considering a larger number of operating parameters than heretofore possible with mechanical and vacuum systems.

It is an object of the present invention to provide a system, and apparatus to control the ignition instant, or timing (with respect to piston position) by an electronic system, in which the characteristic curves, and transfer curves between sensed input and ignition timing can be freely selected for best matching to engine operating requirements, which is simple in construction and requires comparatively few electronic components and, preferably, further permits freedom in selecting operating parameters which control the ignition timing.

SUBJECT MATTER OF THE PRESENT INVENTION

Briefly, a comparator stage is provided, connected to the output of a sawtooth wave generator. The sawtooth wave generator provides a sawtooth wave which generates a rising flank, when a pulse generator (providing pulses in synchronism with engine rotation, for example a predetermined time before the piston reaches upper dead center position). The other input of the comparator stage is connected over at least one function generator which provides an output transfer function, under control of an operating paramter of the engine. The function generator itself is connected and triggered by the pulse generator, at a suitable time, which is modified by the function of the operating parameter, as introduced through the function generator.

Preferably, a monostable multivibrator, triggered by the pulse generator is connected to a storage or memory stage which, in turn, provides a signal to the function generator, from which the timing, depending on the operating paramter and the transfer function set into the function generator, can be determined.

The operating parameters control the internal combustion engine, in accordance with a feature of the invention, by modifying the output signal of the memory or storage stage in dependence on the function, as controlled by the operating parameter of the engine.

The system uses a minimum of electronic components. It can be used for symmetrically, as for as for non-symmetrical offset cylinders of the internal combustion engine; by parallel connection of any desired number of function generators, and adding the resulting output, any desired number of operating parameters, and typical transfer functions can be considered by the system, in order to control the timing of the ignition pulse.

The invention will be described by way of example with reference to the accompanying drawings, wherein.

Figure 7:
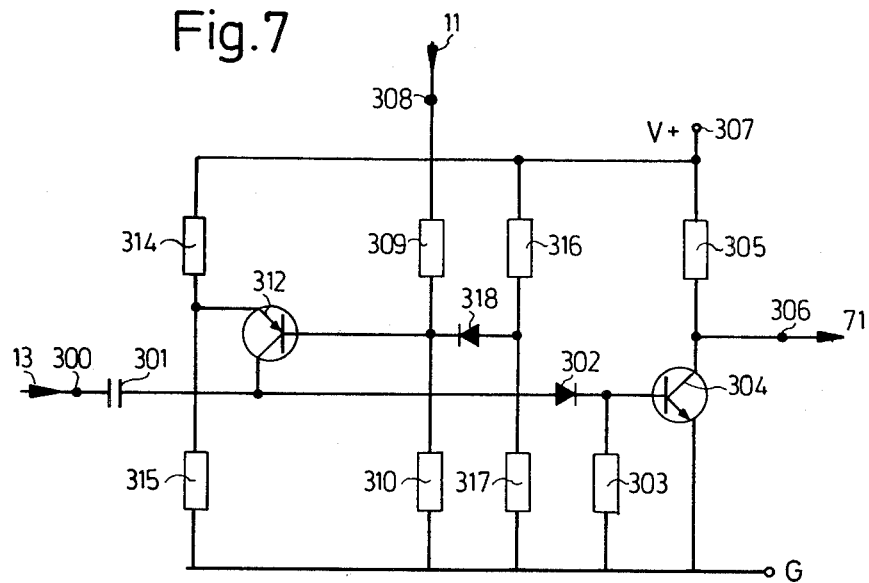
FIG. 7 is a circuit diagram of the controlled current source and monostable flip-flop, elements 18 and 70' of FIG. 5.
Figure 8:
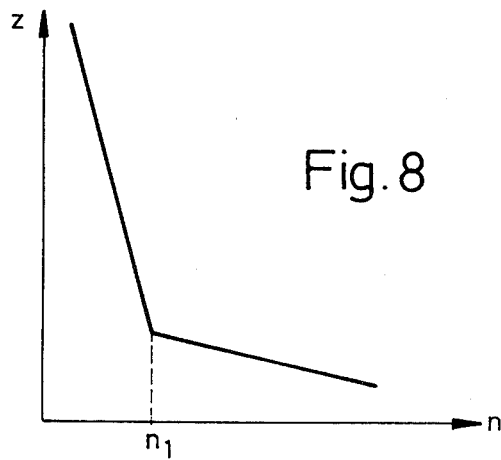

and FIG. 8 is a graph illustrating the operation of FIG. 7.

Figure 1:
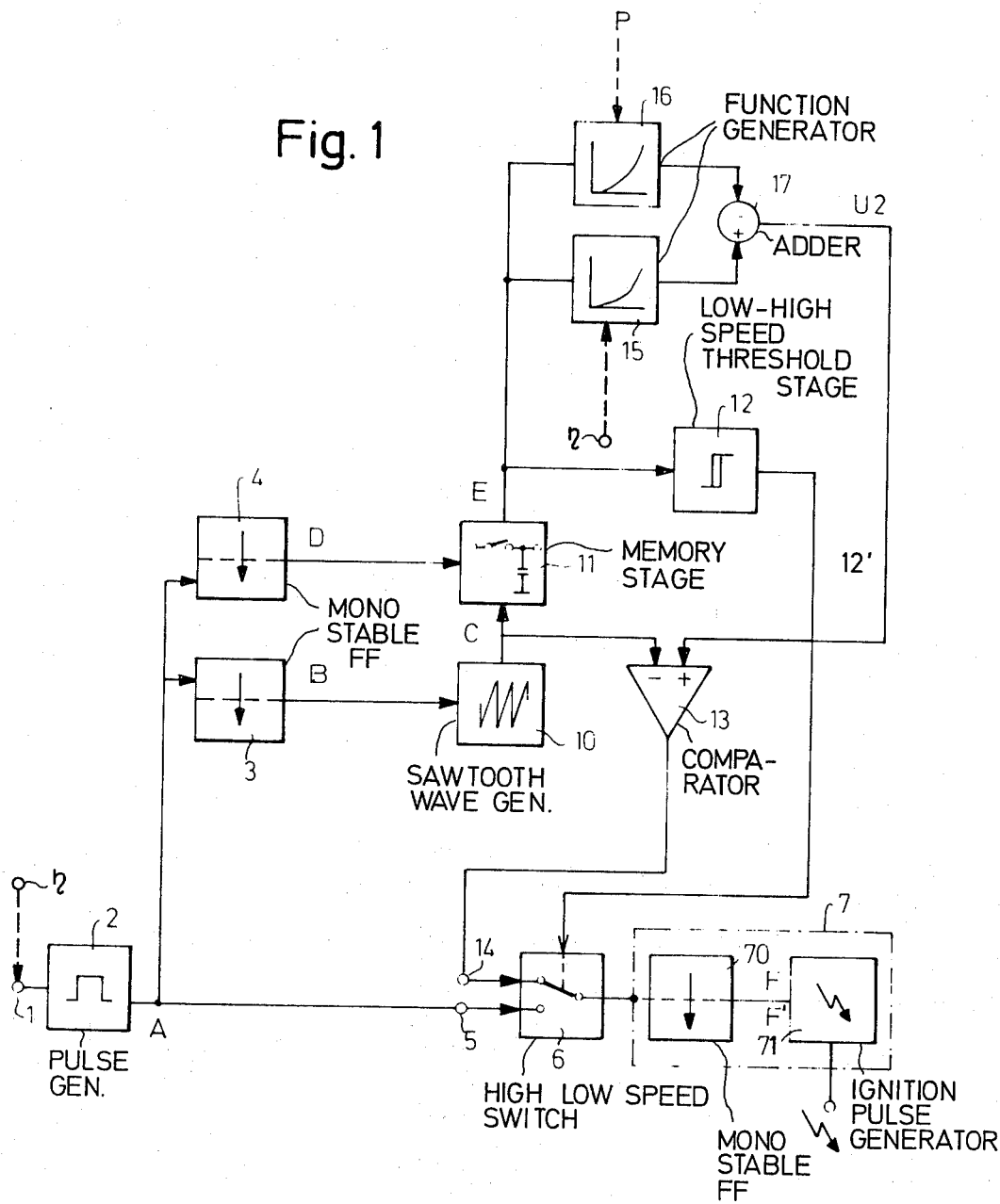
FIG. 1 is a schematic block circuit diagram of an embodiment of the present invention.

The system of FIG. 1 is intended to be coupled to an internal combustion engine. The crankshaft of the internal combustion engine is connected to a transducer, for example an optical transducer, inductive transducer, a carrier frequency transducer, or the like, to provide output pulses at a time, or during a time interval which is accurately matched to a specific angular position of the crankshaft of the engine, and thus is predetermined with respect to the position of the piston of the engine in the cylinder. Preferably, the setting is so made that a pulse is obtained at a point which is 30° in advance of the upper dead center position of the piston. At that instant, a voltage, for example transmitted over a differential amplifier and in form of a needle pulse is applied at terminal 1. The connection of this signal to the engine which, effectively, is a speed signal, is schematically indicated by the dotted line from terminal n. This needle or trigger pulse connected to terminal 1, and derived from the engine, and representative of a fixed position of the piston in the cylinder, with respect to the upper dead center position, is transmitted to a pulse generator stage 2, which provides an output pulse A at the output thereof. The pulse A is schematically indicated on FIG. 1, and also shown in the first line of the timing diagram of FIG. 2. The output of pulse generator 2 is directly coupled to one terminal 5 of a high-low speed transfer switch 6, having a second input terminal 14. The output of the high-low speed switch 6 is connected to an ignition pulse generator system 7, which includes a monostable flip-flop (FF) 70, which controls an ignition pulse generator 71. The output of the ignition pulse generator 71 is connected to a spark plug, as schematically shown by the electric lightening symbol.

The output of the pulse generator stage 2 is additionally connected to the inputs of two monostable flip-flops 3, 4, respectively. The first monostable flip-flop 3 is triggered by the rising flank of the signal A, and provides an output signal B at the output of the FF 3, as seen in the second graph of FIG. 2. The FF 4 is triggered by the trailing flank of the pulse A, and provides a signal D, as shown in the fourth graph of FIG. 2.

Figure 2:
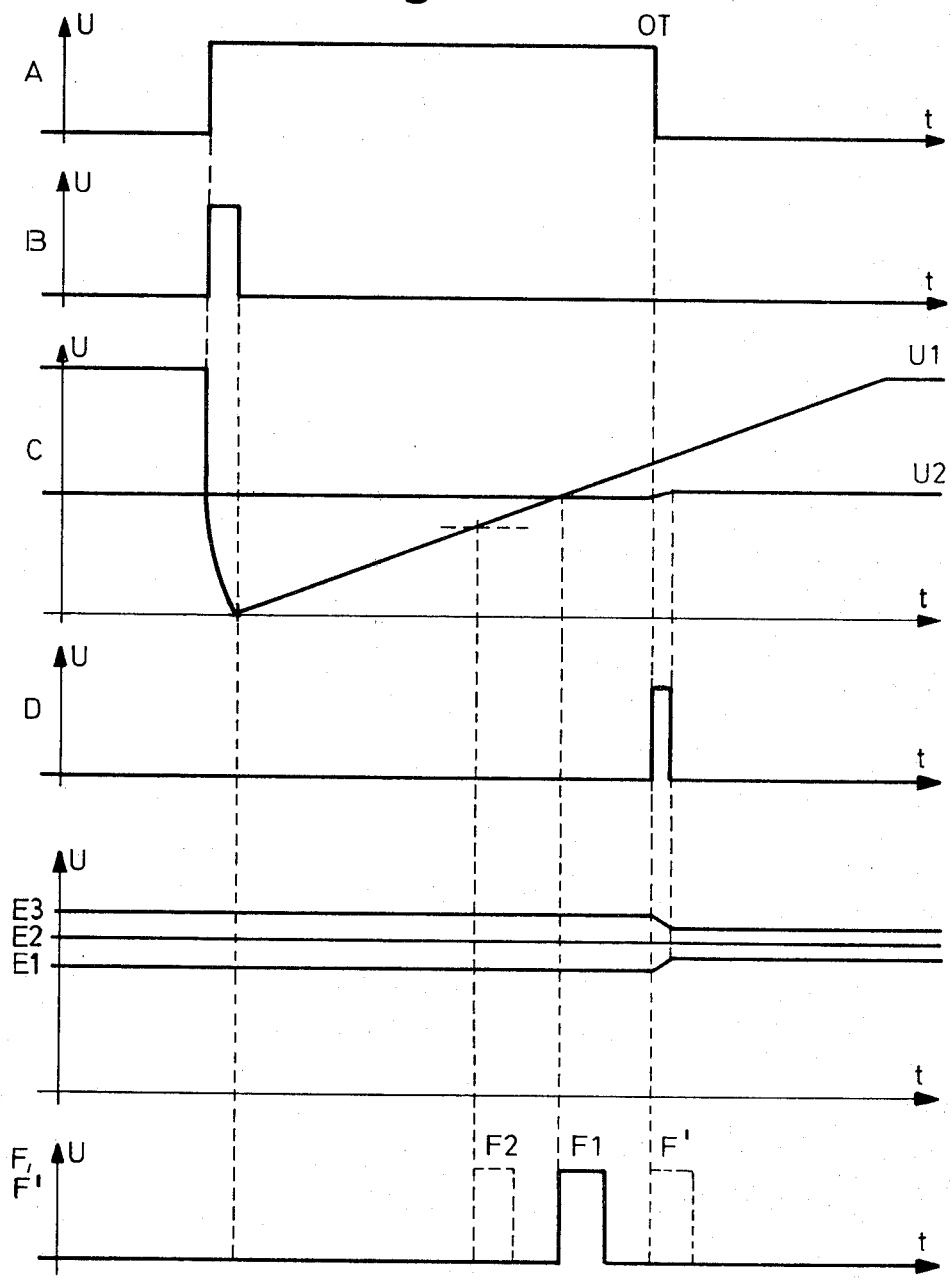
FIG. 2 shows a group of timing diagrams, illustrating voltages arising in the system.

The signal B from the monostable FF 3 is connected to the input of a sawtooth wave generator 10. The signal B resets the sawtooth wave generator, and upon its termination, the sawtooth wave generator is started anew, to start a new sawtooth wave C, as shown in the third line of FIG. 3. The sawtooth wave increases to a saturation value U1. The saturation, or maximum value U1 remains at the output of the sawtooth wave generator, until a new signal B re-sets the sawtooth wave generator and starts a new sawtooth wave. This sawtooth wave C, third line of FIG. 2, is connected to the input of a comparator 13 and further to the input of a storage or memory stage 11.

The second monostable FF 4 is started by the trailing flank of the signal A, derived from the output of the pulse generator 2, and provides an output trigger signal D (fourth line in FIG. 2) to the memory stage 11. The storage content of stage 11 is compared during the interval of the signal D with the instantaneous voltage of the sawtooth generator 10. Upon coincidence of the two voltages, the output signal E from stage 11 remains unchanged. This is indicated by the voltage E2 in the fifth line of the diagram of FIG. 2. If the sawtooth voltage is greater than the voltage in the memory stage during the timing interval determined by the signal D, a capacitor in stage 11 is charged during the duration of the signal D. The output from stage 11 is then indicated by the graph E1. The graph E3 shows the case when the storage capacitor discharges, that is, when the voltage applied by the sawtooth wave generator to the memory stage, during the timing interval of the signal D is less than the voltage previously in the memory stage, thus causing discharge of the capacitor in the memory stage 11.

The voltage from the memory stage, generally designated as E is applied to several stages. One stage is a low-high speed threshold stage 12. This threshold stage compares the value of the signal E with a predetermined value representative of a predetermined speed of the engine. The output voltage from the threshold stage 12 provides a control voltage to the high-low speed switch 14 over line 12'. If the speed is low, the pulses A from pulse generator 2 are directly connected from terminal 5 to the ignition system 7. If the speed of the engine exceeds a predetermined value - as set in the threshold stage 12 - then switch 6 changes to the position shown in FIG. 1 and connects pulses from comparator 13 over terminal 14 to the ignition system 7.

Low-speed operation: Let it be assumed that the threshold stage 12, over line 12', controls high-low speed switch 6 to change into the position not shown in FIG. 1, that is, to connect pulses from pulse generator 2 directly to ignition system 7. The monostable FF 70 is triggered by pulses connected from the switch 6 and provides pulses F, F' or F2, respectively, which are transformed in the ignition pulse generator 71 into the ignition pulses which are applied to a spark plug. Pulses controlled directly from pulse generator 2 through switch 6 are triggered by the negative flank of the signal A (FIG. 2) and result in pulses F'. The pulse provided by pulse generator 2, that is, signal A starts before the piston reaches top dead center position and terminates preferably approximately when the piston is at dead center position, as indicated by the time OT at signal A. Thus, the ignition pulse from the ignition pulse generator 70, triggered from the monostable FF 70, will occur about the time when the piston has reached upper dead center position.

High-speed operation, and engine timing controlled by engine operating parameters: The output voltage E of the memory or storage stage 11 is additionally connected to one or more function generators, of which two function generators 15, 16 are shown. These function generators are of the type well known in analog computation technology. First function generator 15 has as an input a signal representative of engine speed, as schematically indicated by the terminal $n$ and provides an output, that is, it modifies or shifts the signal E in dependence on the function set into the function generator 15, depending on the speed of the engine, with respect to the transfer function of the function generator 15. The second function generator 16 is controlled from a transducer sensing pressure (or, rather: vacuum) in the inlet manifold of the internal combustion engine and provides a function depending on inlet vacuum pressure P, and also shifting the signal E in accordance with the function set into function generator 16. The output voltages from the function generators 15, 16 are added in an adder stage 17 (which is bi-directional, that is, adds algebraically, as shown by the − and + symbols) providing at the output thereof a signal U2 (FIG. 2). The signal U2 is connnected to the second input of the comparator stage 13.

When the sawtooth wave voltage C (FIG. 2) has reached the value U2, the comparator 13 triggers monostable FF 70, provided high-low speed switch 6 is connected as shown in solid lines in FIG. 1. The pulse triggering FF 70 is shown at F1 in the last line of the timing diagrams of FIG. 2. If the voltage U2 drops, for example by increase in speed, or due to changes in other operating parameters of the engine, for example change in pressure P as converted in the function characteristics of engine operation by function generator 16, the sawtooth wave C is matched earlier by the value U2, thus resulting in advancing the spark, and providing a pulse at the time shown at F2. If, on the other hand, the voltage U2 increases, the pulse generated by FF 70 will be retarded, shifting in the direction towards the pulse F'.

Figure 3:
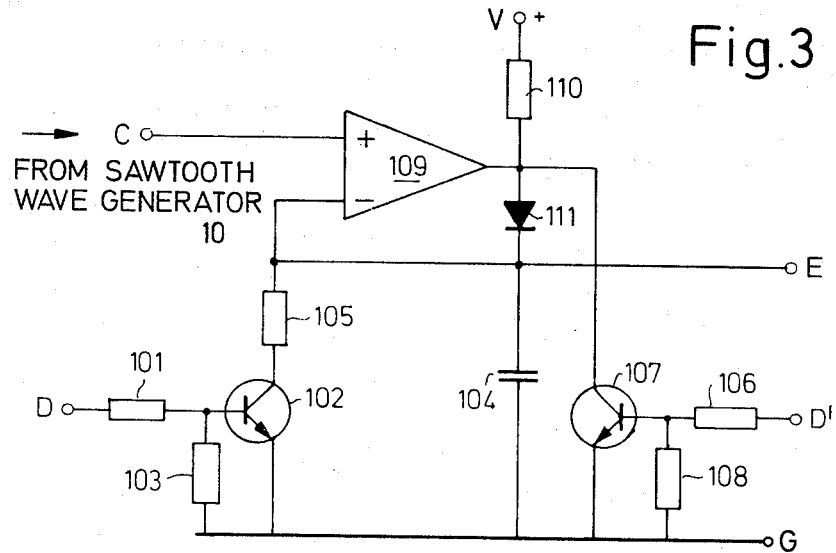
FIG. 3 is a detailed circuit diagram of a storage, or memory circuit.

Storage, or memory stage 11, with reference to FIG. 3: The output of monostable FF 4 is connected over a resistor 101 with the base of a transistor 102. Resistor 103 provides base bias. Capacitor 104, connected to ground, or chassis or common line, or bus G has its free electrode connected, over a currentlimiting resistor 105 to the collector of transistor 102. The emitter of transistor 102 is connected to chassis bus G. The complementary output D' from FF 4 is connected over a resistor 106 to the base of a second transistor 107, which has a base bias resistor 108. The output of an operational amplifier 109 is connected to the collector of transistor 107, the emitter of which is connected to chassis bus G. The output of operational amplifier 109 is further connected over a resistor 110 with a source of positive voltage V, and over a diode 111 with the inverting input of the operational amplifier. The inverting input of the operational amplifier 109 is further connected to the junction between the capacitor 104 and the resistor 105, and forms the output of the storage stage 11, at which the signal E appears. The non-inverting input of the operational amplifier 109 is connected to the signal C (FIG. 2), that is, to the output of the sawtooth wave generator 10.

Operation: If signal D is missing, and there is no complementary signal D', transistor 102 is blocked, and transistor 107 is conductive. The anode of diode 111 is thus connected, effectively, to chassis G, and thus is blocked. Capacitor 104 is isolated, and retains its previous charge; it is neither charged nor discharged.

During the duration of the signal D, and D', respectively, transistor 102 becomes conductive and transistor 107 blocks. Two cases are to be distinguished:

a. if the sawtooth voltage C connected to the direct input of operational amplifier 109 is greater than the voltage on capacitor 104, a positive signal will occur at the output of operational amplifier 109. This causes diode 111 to become conductive, permitting capacitor 104 to charge over resistor 110 from the source V, and over diode 111 for the duration of the signal D, and D', respectively. Simultaneously, current will flow over the current limiting resistor 105 and transistor 102. This condition is shown in FIG. 2, fifth line, at graph E1;

b. if the sawtooth voltage C is smaller than the voltage on storage capacitor 104, diode 111 is blocked. Capacitor 104 may discharge, however, during the duration of the pulse D and D', respectively, over the current-limiting resistor 105 and the conductive transistor 102. This condition is illustrated in FIG. 2 in the diagram E3.

Figure 4:
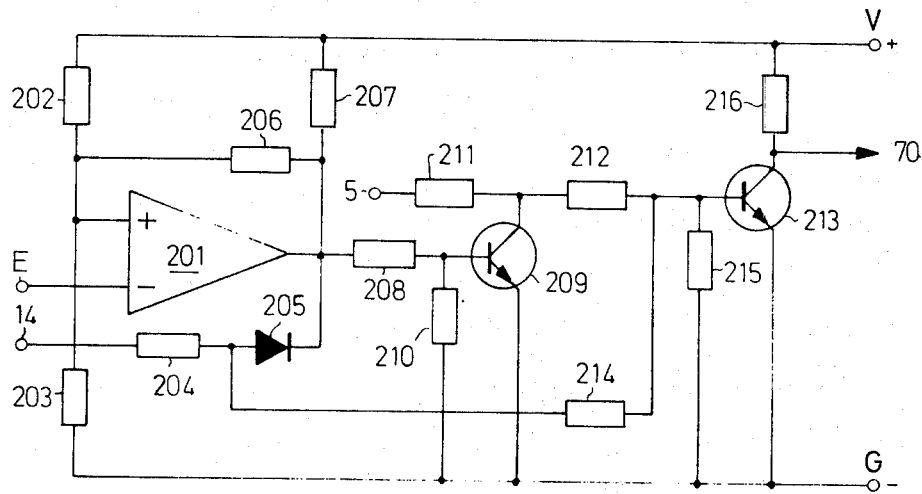
FIG. 4 is a detailed circuit diagram of a speed threshold sensing switch.

Low-high speed threshold stage 12, and speed transfer switch 6, with reference to FIG. 4: The output voltage E (FIG. 2) from the memory stage 11 is connected to the inverting input of an operational amplifier 201. The direct input of operational amplifier 201 is applied to a constant voltage source, derived from a voltage divider formed of resistors 202, 203 connected across terminals V, G. The value of the voltage is determined by the ratio of the resistance of resistors 202, 203. Comparator 13 (FIG. 1) is connected to terminal 14 (FIGS. 1, 4), and hence over resistor 204 and diode 205 to the output of operational amplifier 201. Resistor 206 is connected between the output of the operational amplifier 201 and its direct input as a negative feedback resistor. The output of operational amplifier 201 is connected over resistor 207 with the positive terminal V, and over resistor 208 with the base of a short-circuiting transistor 209. The base voltage across transistor 209 is dropped over base resistor 210. The output signal A of the pulse generator stage 2 (FIG. 1) is connected to terminal 5 (FIGS. 1, 4) and then over a resistor 211 which connects to the collector of the short-circuiting transistor 209, the emitter of which is connected to the chassis bus G. The collector of transistor 209 is further connected over resistor 212 with the base of a switching transistor 213. The junction between resistor 204 and diode 205 is connected over a resistor 214 to the base of the switching transitor 213. The base voltage for the transistor 213 is dropped across resistor 215. The collector of switching transistor 213 is connected over resistor 216 to positive bus V, and further to the monostable FF 70 in the ignition system 7. The emitter of transistor 213 is connected to chassis bus G.

Operation

The voltage set by voltage divider 202, 203 determines a reference voltage, representing a predetermined engine speed. Below a certain speed, as determined by the resistances of resistors 202, 203, the voltage E is higher than that reference voltage. The output of the operational amplifier is at zero voltage. The short-circuiting transistor 209 hence is blocked, diode 205 is conductive and short-circuits the current from comparator stage 13 connected to terminal 14. A signal A connected to terminal 5, and hence to the base of switching transistor 213 is thus effective. This signal, therefore, at low speeds controls the output from the transistor 213, and hence the FF 70, to determine the ignition timing instant.

If a predetermined speed is reached, the signal E becomes less than the reference voltage at the input of the operational amplifier 201, as determined by the ratio of resistances of the resistors 202, 203. When this voltage becomes less, the output of the operational amplifier changes to a positive value. This causes transistor 209 to become conductive, causing diode 205 to block. The signal connected to terminal 14 is now transferred to the base of the switching transistor 213 over resistor 214. The signal A (FIG. 2) connected to terminal 5 is short-circuited over the emitter-base path of the short-circuiting transistor 209. Switching transistor 213 is thus controlled by the signal derived from the comparator stage 13, and the ignition timing, that is, the occurrence of the ignition pulse with respect to piston position is determined by the signal connected to terminal 14.

Figure 5:
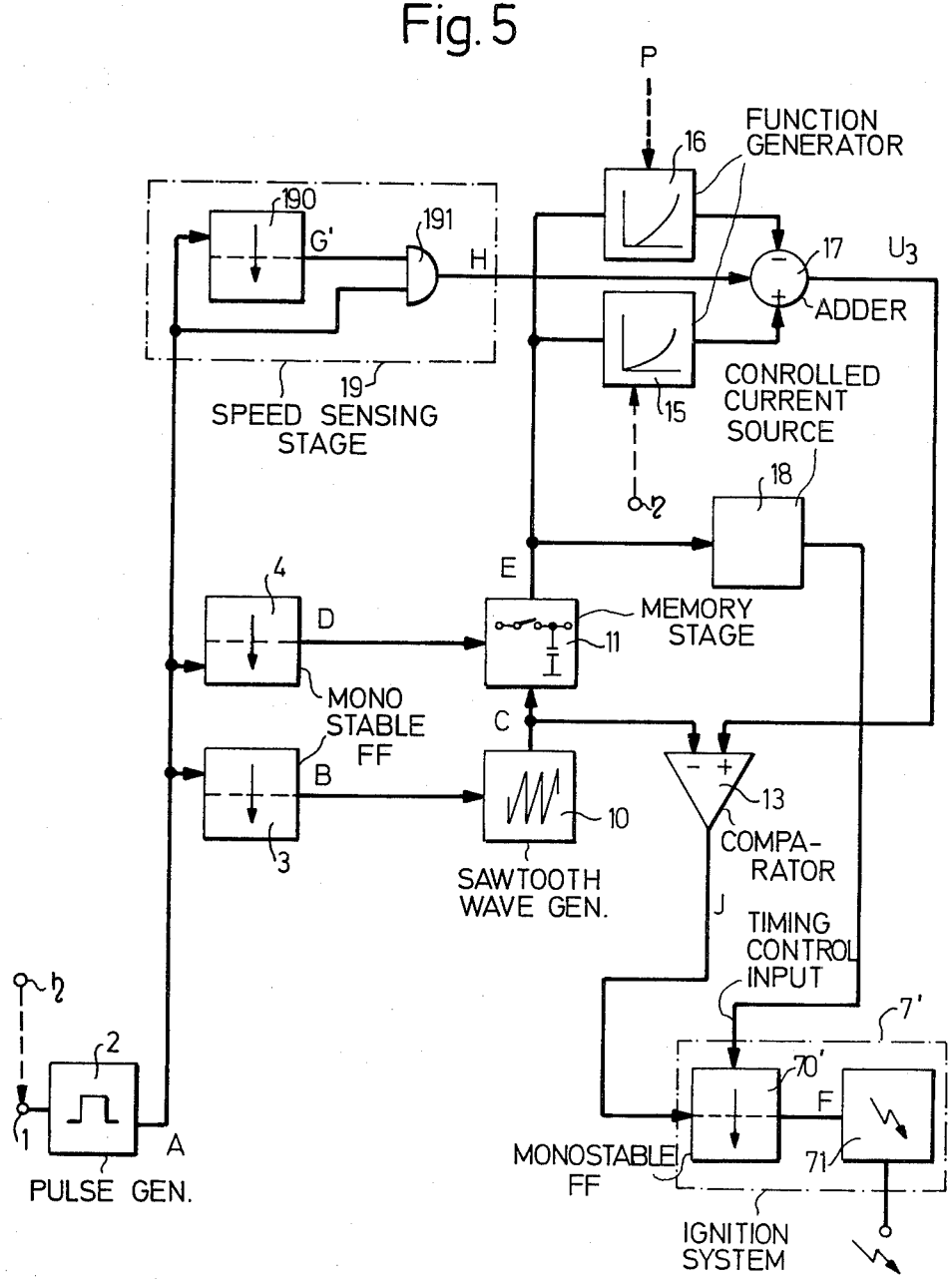
FIG. 5 is a schematic block circuit diagram of another embodiment of the present invention.

Embodiment of FIG. 5: Essentially, the operation and construction of the system is similar to that of the embodiment of FIG. 1, and similar parts have been given similar reference numerals and will not be described in detail. The speed threshold stage 12, and the transfer switch 6 are not used. The output of the pulse generator 2 is connected, in addition to the connections to FF's 3, 4, to a speed sensing stage 19 which is additionally connected to the adder 17, to introduce another parameter into the signal adder 13. Speed sensing stage 19 includes a monostable FF 190, connected to the output of pulse generator 2, and an AND-gate 191, one input of which is likewise connected to the output of the pulse generator 2. The output of FF 190 is connected to a dynamic input of the AND-gate 191, the output of which provides a signal H which is connected to the adder 17. The comparator 13 is connected directly to the input of the monostable FF 70'. FF 70' has an additional input, forming a timing control input, which sets the unstable timing period of the circuit. To set the timing, a controlled current source 18, having its input controlled by memory stage 11, is connected to the timing input of FF 70', to control its ON time.

Figure 6:
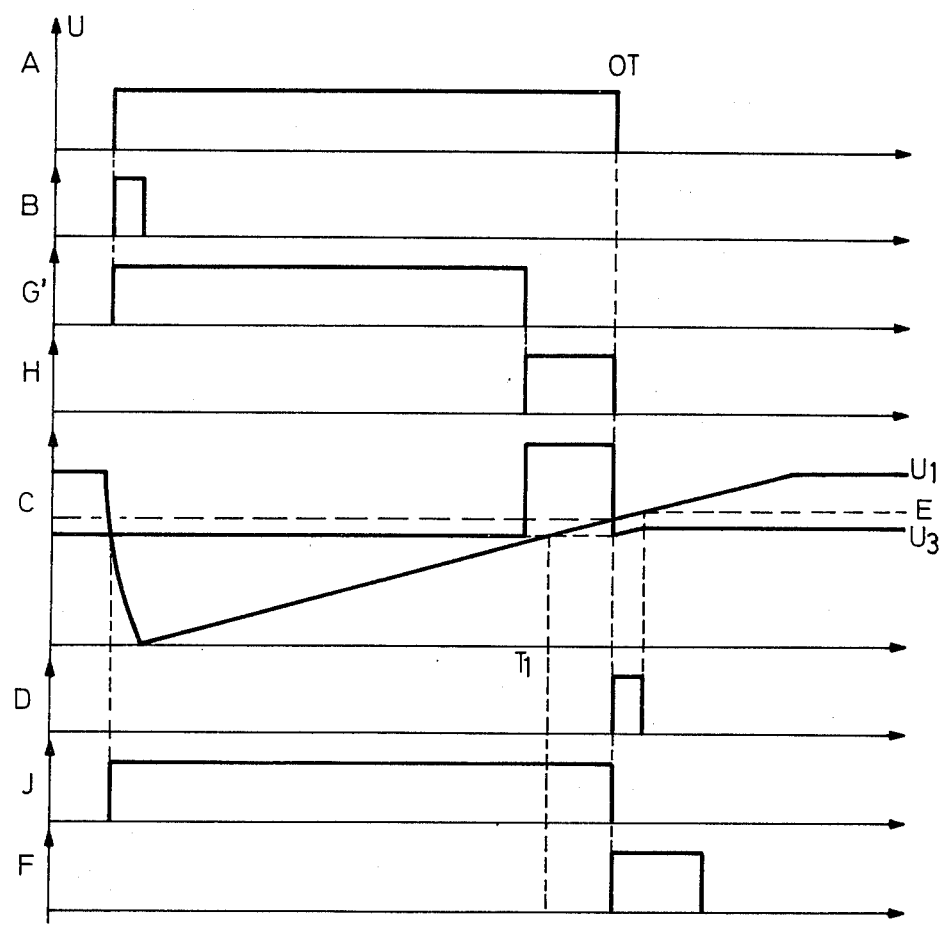
FIG. 6 is a timing diagram of voltages arising in the system of FIG. 5.

Operation, with reference to FIG. 6: Under high-speed conditions, the operation is similar to that explained in connection with FIG. 1. The speed sensing stage 19 provides a signal H (FIG. 6) only at low speeds. The rising flank of the signal A starts the FF 190, providing an output signal G' (FIG. 6). Signal H is generated upon occurrence of the trailing flank of signal G' if, simultaneously, a pulse A from pulse generator 2 is provided. The signal H, therefore, is generated only if the timing period of the monostable FF 190 is shorter than the overall signal duration of the signal A, that is, upon low speeds. The signal H is so dimensioned that it is dominant with respect to the signals from the function generators 15, 16. The composite output signals of stages 19, 15, 16, together, provide the signal U3. Signal H influences the value of signal U3 to such an extent that the intersection between signals U3 and C, from the sawtooth generator 10, is only reached upon occurrence of the trailing flank of the signal A, that is, at the upper dead center position; only the trailing flank of the signal J from comparator 13 will start the FF 70' of the ignition system 7'. Without the signal H, the intersection between the C signal and the U3 signal would have occurred earlier, as indicated in the dashed line T1 in FIG. 6. The speed sensing stage, therefore, effects the generation of ignition pulses at the upper dead center position.

Controlled current source 18 and monostable FF 70' are shown, in detail, in FIG. 7. Comparator 13 is connected to a terminal 300. The FF 70 includes the components 301 to 305. Terminal 300 is connected to the series circuit formed of a capacitor 301 and a diode 302, and then to the base of npn transistor 304. The emitter of transistor 304 is connected to the chassis bus G; the collector is connected over terminal 306 to the ignition pulse generating stage 71, and over a resistor 305 to the positive source V, at terminal 307. The memory stage 11 is connected to terminal 308 and then to a voltage divider formed of resistors 309, 310. The tap point of the voltage dividers 309, 310 is connected to the base of a pnp transistor 312. The emitter of the transistor 312 is connected to the tap point of a voltage divider formed of resistors 314, 315; the resistors are connected between the positive and negative buses V and G. The collector of transistor 312 is connected to the junction between the capacitor 301 and the diode 302. A further voltage divider formed of resistors 316, 317, and connected between buses V and G has its tap point connected over a diode 318 with the tap point of the voltage divider formed of resistors 309, 310.

Operation, with reference to FIG. 8: Transistor 304, under normal ordinary condition, is conductive, and the voltage at terminal 306, therefore, is low. The trailing flank of the J signal (FIG. 6) suddenly discharges the capacitor 301, causing transistor 304 to block. The voltage at terminal 306 thus rises, commanding generation of an ignition pulse in stage 71. Capacitor 301 is then re-charged over transistor 312. When the capacitor 301 has reached a certain voltage level, transistor 304 again becomes conductive and the voltage at the terminal 306 drops. The charge time of the capacitor 301, therefore, is the same as the control time for the ignition pulse generating stage 71, and thus is a measure of the ignition energy which is provided. Terminal 308 can be used to influence the charge time of the capacitor 301 by the voltage E. This influence is so designed that the relationship illustrated in FIG. 8 is obtained, in which the ignition energy Z is shown with respect to speed $n$. At high speeds, this is, at low voltages of E, transistor 312 is highly conductive, and capacitor 301 is rapidly charged. This, then, provides for low ignition energy. As the speed drops, voltage E increases and the charge current for capacitor 301, through transistor 312, decreases, causing an increase in ignition energy. At a certain threshold speed $n1$, the voltage on the base of transistor 312 will have risen to such a level that the previously conductive diode 318 begins to block. The voltage at the base of transistor 312 can now rise rapidly as the speed drops, which is indicated by the left-hand portion of the graph in FIG. 8, showing rapid rise of ignition energy at low-speed values, and a sharp knee at the curve.

Changing the holding time of the monostable FF with respect to speed avoids terminal overloading of the ignition coil, and therefore guarantees the necessary ignition energy.

The ignition pulse generator 71 may be any well known ignition system, including an ignition coil, and appropriate distribution circuitry.

Various changes and modifications may be made within the scope of the inventive concept.

We claim:

1. Electronic ignition pulse generation and timing control circuit for internal combustion engines, in which the timing of the ignition pulse with respect to piston position of the internal combustion engine is controlled in dependence on engine operating parameters, comprising pulse generating means (2) to generate a pulse (A) having a predetermined time relation with respect to piston position;

ignition pulse generating means (7, 70, 71) to generate ignition pulses for connection to a spark plug of the engine;

engine operation parameter signal generation means (15, 16, 17) providing signals (U2) representative of engine operating conditions;

a sawtooth wave generator (10) connected to and controlled by the pulse generator means (2);

and means deriving an ignition control signal connected to the ignition pulse generating means (7, 70, 71) to control generation of the ignition pulse at a predetermined instant of time with respect to said piston position, characterized in that the operation signal parameter generating means comprises at least one function generator (15, 16), a storage circuit (11) storing an electrical quantity representative of the timing of a prior ignition pulse with respect to said piston position, the output (C) of the sawtooth wave generator (10) being connected to the storage circuit (11);

a monostable flip-flop (4) connected to be triggered (D) by the trailing flank from the pulse (A) of the pulse generating means (2), and connecting said storage circuit (11) to store a value (e) of the sawtooth wave (C) upon termination of the pulse from the monostable FF (4), said value (E) being connected as an input to the function generator, or generators (15, 16), to modify the output of the stored quantity by a function of an operating parameter of the engine, the output from said function generator, or generators forming the output of the engine operating parameter signal generating means;

and a comparator (13) having one input connected to the output of the sawtooth wave generator (13) and another input connected to the output of the function generator, or generators (15, 16) and providing an ignition control signal to said ignition pulse generating means upon coincidence of output from said sawtooth wave generator and said function generator, or generators.

2. Circuit according to claim 1, further comprising means (3) triggering start of generation of sawtooth waves from the leading flank of the pulse (A) generated by the pulse generator (A).

3. Circuit according to claim 1, further comprising a speed threshold switch (12) connected to sense a predetermined engine operating speed;

and a high-low speed switch (6) connected in advance of the ignition pulse generating means (7, 70, 71) and, selectively, controlling timing of the ignition pulse generating means from (a) said comparator or (b) said pulse generator, under command of the threshold switch and in dependence upon whether (a) the speed of the engine is in excess of a predetermined value or (b) said speed is below said predetermined value.

4. Circuit according to claim 1, wherein the function generator means comprises a function generator modifying the signal from the storage means by a function representative of input manifold pressure (P).

5. Circuit according to claim 1, wherein the function generator means comprises a function generator (15) modifying the signal from the storage means by a function representative of engine speed (n).

6. Circuit according to claim 1, wherein the monostable flip-flop (4) comprises complementary outputs;

the storage circuit (11) comprises two transistors (102, 107), one each controlled by an output from the monostable flip-flop (4);

an operational amplifier (109) connected to and controlled by the sawtooth wave generator (10), and having an output connected to the first transistor (107), said transistor short-circuiting the output from the operational amplifier upon absence of a complementary signal from the monostable FF (4);

a storage capacitor (104) and a diode (111) connecting the storage capacitor to the inverting input of the operational amplifier (109).

7. Circuit according to claim 6, further comprising resistance means (105) connecting the inverting input of the operational amplifier to the emitter-collector path of the second transistor (102), and to ground (G).

8. Circuit according to claim 2, wherein the speed threshold switch (12) comprises an operational amplifier (201), said operational amplifier being connected as a comparator, and comparing a reference voltage (V, G; 202, 203) with a voltage representative of speed of the engine (E).

9. Circuit according to claim 8, wherein the output of the comparator (13) is connected over a diode (205) with the output of the operational amplifier (201) in the speed threshold switch (12) and to the base of a switching transistor (213).

10. Circuit according to claim 9, wherein the output voltage (A) of the pulse generator stage (2) is connected to the base of the switching transistor (213); and a short-circuiting transistor (209), the conduction of which is controlled by the output of the operational amplifier (201) short-circuiting, selectively, the pulse (A) from the pulse generator means.

11. Circuit according to claim 1, further comprising (FIG. 5) a speed sensing stage (19), connected to and controlled by the pulse generator (2);

the output of the speed sensing stage being connected to the input of the comparator (13).

12. Circuit according to claim 11, wherein the speed sensing stage (19) comprises a monostable circuit (190) and a logic gate (91), the output signal (H) from the logic gate arising if: (a) the unstable time of the monostable circuit (190) is shorter than the duration of the pulse (A) from the pulse generator (2).

13. Circuit according to claim 11, wherein the output from the speed sensing stage (19) is combined with the output of the function generator, or generators, the output of the speed sensing stage being much larger with respect to the output, or ouputs of the function generator, or generators, and and dominating said function signals.

14. Circuit according to claim 1, further comprising (FIG. 5, FIG. 7, FIG. 8) a controlled current source (18);

a monostable flip-flop (70) connected to and included in said ignition pulse generating means, the output of said controlled current source determining the unstable time of said monostable FF (70), the controlled current source being controlled by the output of said storage circuit (11).

15. Circuit according to claim 14, wherein the ON time of the monostable FF (70) is controlled to decrease with increasing speed of the engine.

16. Circuit according to claim 15, wherein a controlled rectifier (312) is included in said controlled current source (18), the conduction of said controlled rectifier being controlled by the signal (E) from the storage circuit (11);

a capacitor (301) is provided, the charge state of said capacitor being controlled by the current from said controlled rectifier to determine the ON time of the monostable FF.

17. Circuit according to claim 16, further comprising a diode (318) in the controlled current source (18) to provide a sharp bend or knee in the ignition energy-speed curve of the speed-ignition energy characteristics.

18. Circuit according to claim 1, wherein the pulse generating means (2) provides a pulse (A) beginning at a predetermined time instant in advance of the upper dead center position of a piston of the internal combustion engine;

and terminates at the time said piston reaches said dead center position, the pulse generating means being connected to and controlled by the internal combustion engine and providing said pulses in synchronism with rotation of the engine.

19. Circuit according to claim 1, wherein the sawtooth wave generator is connected to and controlled by the leading flank of the pulse generator means (2) to start a timing interval, by providing a rising output voltage (C) connected to the comparator;

and said comparator compares the instantaneous value of said rising current wave (C) from the sawtooth wave generator with a voltage value representative of operating functions and parameters of the engine including at least one of: speed; inlet manifold vacuum, the comparator, upon coincidence of voltages, providing an output signal to control the ignition generating means to provide an ignition pulse, said voltage from said function generator means being less than the maximum voltage from said sawtooth wave generator (10) to provide an ignition pulse in advance of upper dead center position of the piston, the extent of advance of ignition timing being controlled by the operating parameter, or parameters of the engine, in accordance with the timing-parameter change function, as determined by the function generator means.

* * * * *

UNITED STATES PATENT OFFICE
CERTIFICATE OF CORRECTION

Patent No. 3874351      Dated April first, 1975

Inventor(s) Karl-Heinz ADLER, et al

It is certified that error appears in the above-identified patent and that said Letters Patent are hereby corrected as shown below:

the first and fifth inventors names should read correctly:

Karl-Heinz A<u>D</u>LER

Wolfgang REICHARD<u>T</u>

Signed and Sealed this fifth Day of August 1975

[SEAL]

Attest:

RUTH C. MASON
*Attesting Officer*

C. MARSHALL DANN
*Commissioner of Patents and Trademarks*